United States Patent [19]
Parker et al.

[11] Patent Number: 5,524,209
[45] Date of Patent: Jun. 4, 1996

[54] SYSTEM AND METHOD FOR CONTROLLING THE COMPETITION BETWEEN PROCESSORS, IN AN AT-COMPATIBLE MULTIPROCESSOR ARRAY, TO INITIALIZE A TEST SEQUENCE

[76] Inventors: Robert F. Parker, 6122 Pancho Villa Dr., San Jose, Calif. 95119; Anil K. Gupta, 3650 Berkeley Ct., Apt. 302, Santa Clara, Calif. 95051

[21] Appl. No.: 396,402

[22] Filed: Feb. 27, 1995

[51] Int. Cl.$^6$ ................................................. G06F 11/00
[52] U.S. Cl. ........................................................ 395/183.12
[58] Field of Search ........................ 395/183.12, 182.08, 395/182.09, 182.1, 182.11

[56] References Cited

U.S. PATENT DOCUMENTS

| | | | |
|---|---|---|---|
| 4,634,110 | 1/1987 | Julich et al. | 395/182.09 |
| 4,812,677 | 3/1989 | Perry | 395/182.22 |
| 5,003,464 | 3/1991 | Ely et al. | 395/182.09 |
| 5,070,450 | 12/1991 | Holman, Jr. et al. | 395/750 |
| 5,140,419 | 8/1992 | Galumbeck et al. | 358/142 |
| 5,276,847 | 1/1994 | Kohn | 395/425 |
| 5,276,893 | 1/1994 | Savaria | 395/800 |
| 5,315,161 | 5/1994 | Robinson et al. | 395/182.22 |
| 5,339,443 | 8/1994 | Lockwood | 395/725 |
| 5,434,997 | 7/1995 | Landry et al. | 395/575 |
| 5,450,576 | 9/1995 | Kennedy | 395/183.12 |

*Primary Examiner*—Robert W. Beausoliel, Jr.
*Assistant Examiner*—Joseph E. Palys
*Attorney, Agent, or Firm*—John J. McCormack; Mark T. Starr

[57] ABSTRACT

A multiprocessor array where any single multiprocessor can be needed to execute a prescribed sequence and more than one of the processors may compete to initialize this sequence, and wherein a "semaphore port" SP is coupled to all processors, this port SP being adapted to normally signal "GO", but after "first-access" by a said processor, which thus becomes a "selected processor", to thereupon signal "STOP" to all other, "non-selected", processors, and so deny access until a given test sequence is completed.

6 Claims, 1 Drawing Sheet

SYSTEM AND METHOD FOR CONTROLLING THE COMPETITION BETWEEN PROCESSORS, IN AN AT-COMPATIBLE MULTIPROCESSOR ARRAY, TO INITIALIZE A TEST SEQUENCE

FIELD OF INVENTION

This invention relates to computer processors, and more particularly to an array thereof.

BACKGROUND, FEATURES

Workers are aware of computer systems having a pair of processor units such as processors CPU-A, CPU-B in FIG. 1. Here, it will be understood, that each processor has equal ability to access all system resources and access is granted on an alternating basis by an arbiter unit ARB. When the system is reset, or power is applied, the processors begin a procedure known as Power-On Self-Test (POST), in which the system is tested and initialized, including memory and chipset registers.

Only one processor is allowed to execute POST, as the code is not reentrant, and having both processors modifying registers and memory independently would cause problems. In addition, if both processors are executing and accessing off-cpu resources, the system will run only half as fast as if one processor were halted.

Another problem involves assigning certain AT-compatible resources to the ("boot") processor which is executing POST. The A20-mask and the port92/keyboard controller reset function must be available to this (boot) processor, but should not be available to the other processor.

Such problems could be alleviated by always allowing the same processor to start POST (let one always be the "boot processor"), while holding the other in some reset or halted state, but this wouldn't afford any flexibility or resiliency; e.g., if the so-designated boot processor failed to start executing, for whatever reason. Thus, it is desirable to allow either processor to execute POST—and such is a salient object hereof.

We propose resolving such problems by using "semaphore" means, whereby each processor must check the semaphore to see if the other has already begun executing POST. The processor that first accesses (captures) the semaphore is allowed to continue, while the other must be prevented from executing POST.

A "memory-based semaphore" is not feasible since the memory has not been initialized. Only one processor should perform the initialization, since it involves writing to chipset configuration registers, so memory cannot be set up to allow the semaphore to reside there. A semaphore based on a standard I/O port will not work because there are no locked cycles to I/O ports: thus, if one processor sees the semaphore as "clear", then before it can "set" the semaphore the other processor might also see it as clear, leading to both processors executing. In addition, neither memory-based nor standard I/O port-based methods allow the assignment of A20-mask and reset to the boot processor.

Solution

Our preferred solution is to provide, as "semaphore", a special I/O port, called a Primary Processor Port (PPP) and use this to "gate" the POST sequence.

An object hereof is to address at least some of the foregoing problems and to provide at least some of the mentioned, and other, advantages.

BRIEF DESCRIPTION OF THE DRAWINGS

These and other features and advantages of the present invention will be appreciated by workers as they become better understood by reference to the following detailed description of the present preferred embodiments which should be considered in conjunction with the accompanying drawings, wherein like reference symbols denote like elements.

DESCRIPTION OF PREFERRED EMBODIMENT

In giving more details of the subject embodiment, it will help to indicate an exemplary use-environment in which such an embodiment can be employed. Such is the arrangement we show in FIG. 1 (called "System DH"). System DH will now be briefly summarized. The methods and means discussed herein, will generally be understood as constructed and operating as presently known in the art, except where otherwise specified; likewise all materials, methods, devices and apparatus described herein will be understood as implemented by shown expedients according to present good practice.

Figure 1:
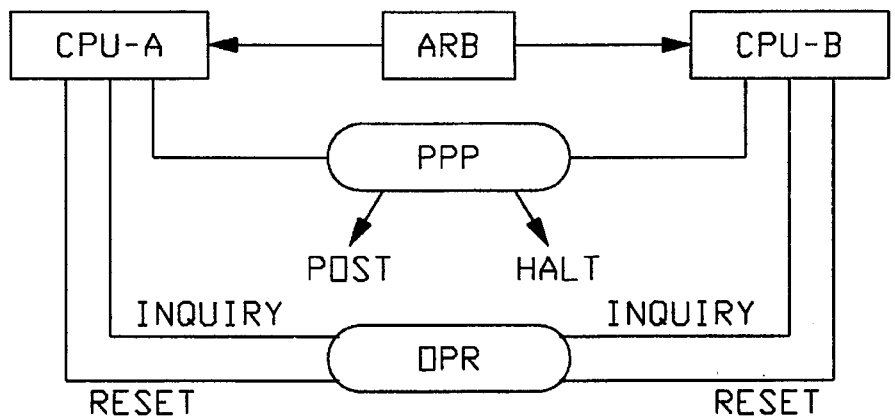
FIG. 1 is a schematic diagram of an embodiment hereof.

In FIG. 1, system DH will be understood to comprise a portion of the processor board for any computer system (e.g., UNIX, DOS, Windows), such as one operating with a pair of Pentium processors CPU-A, CPU-B (assume DH is AT-compatible). Each processor is equally able to access all system resources, with access being granted by an arbiter ARB, on an alternating basis. When the system is "reset", or when power is applied, one processor will usually need to begin POWER-ON-SELF-TEST, or "POST", a procedure for testing and initializing the system. But only one CPU may execute POST.

Thus, according to a salient feature hereof, a special I/O port, PPP (FIG. 1), is provided to decide which CPU executes POST, while keeping the other CPU in "hold" mode. Port PPP is arranged to contain one significant bit, which is cleared to 0 on a reset of the system. The first processor to read the PPP reads the 0 value from the port (and so becomes the "acquiring", or "boot", "processor"). The act of reading the port as 0 causes the state of the bit to switch to 1 for (later) reads by the other (secondary) processor and causes other logic to route the A20-mask and reset to this "boot processor". All subsequent reads of the PPP by the acquiring processor will return 0. The other (secondary) processor reads 1 from the port on all subsequent accesses.

The acquiring processor will proceed to execute POST, while the other secondary processor (reading 1) will halt, perhaps after performing some necessary initializations that do not conflict with those being performed by the acquiring processor.

Other Considerations

Under some circumstances, the system will be reset in a manner that results only in the processors being reset. In this case, the PPP must be rearmed in case the "current-secondary" (non-acquiring) processor later must become the "boot", to then run POST and reset the system. To allow this, a "write" of any value to the PPP causes the port to be rearmed, and the next read of the PPP causes the AT-compatible resources to be (re) assigned and 0 to be read. In this way it is possible to reverse the roles of the processors for new, later boot sequences.

OPR Unit (FIG. 1)

We prefer, here, that the boot processor be able to reset the other processor ("reset-other"). As the AT-compatible reset is assigned to the primary processor, there is no conventional means of doing this. Thus, we prefer to also provide logic, on the processor board, to effect such a "reset-other" function, and do so with an Other Processor Reset (OPR) port. In order to avoid accidental resets of the other (secondary) processor, it is established that activating this function will require three back-to-back I/O cycles, i.e., "read-write-read", with no intervening I/O. The third cycle returns a bit indicating whether "reset-other" has occurred—if not, the sequence is repeated until "reset-other" is confirmed. Thus, one CPU acts on OPR (e.g., "inquiry" line) while the other CPU gets reset thereby.

The foregoing is intended to cover the functionality of the PPP and the OPR. These components solve the fundamental problem of allowing each processor to recognize its role in system start-up and act accordingly, while providing the necessary assignment of hardware resources to a selected boot processor.

Figure 2:
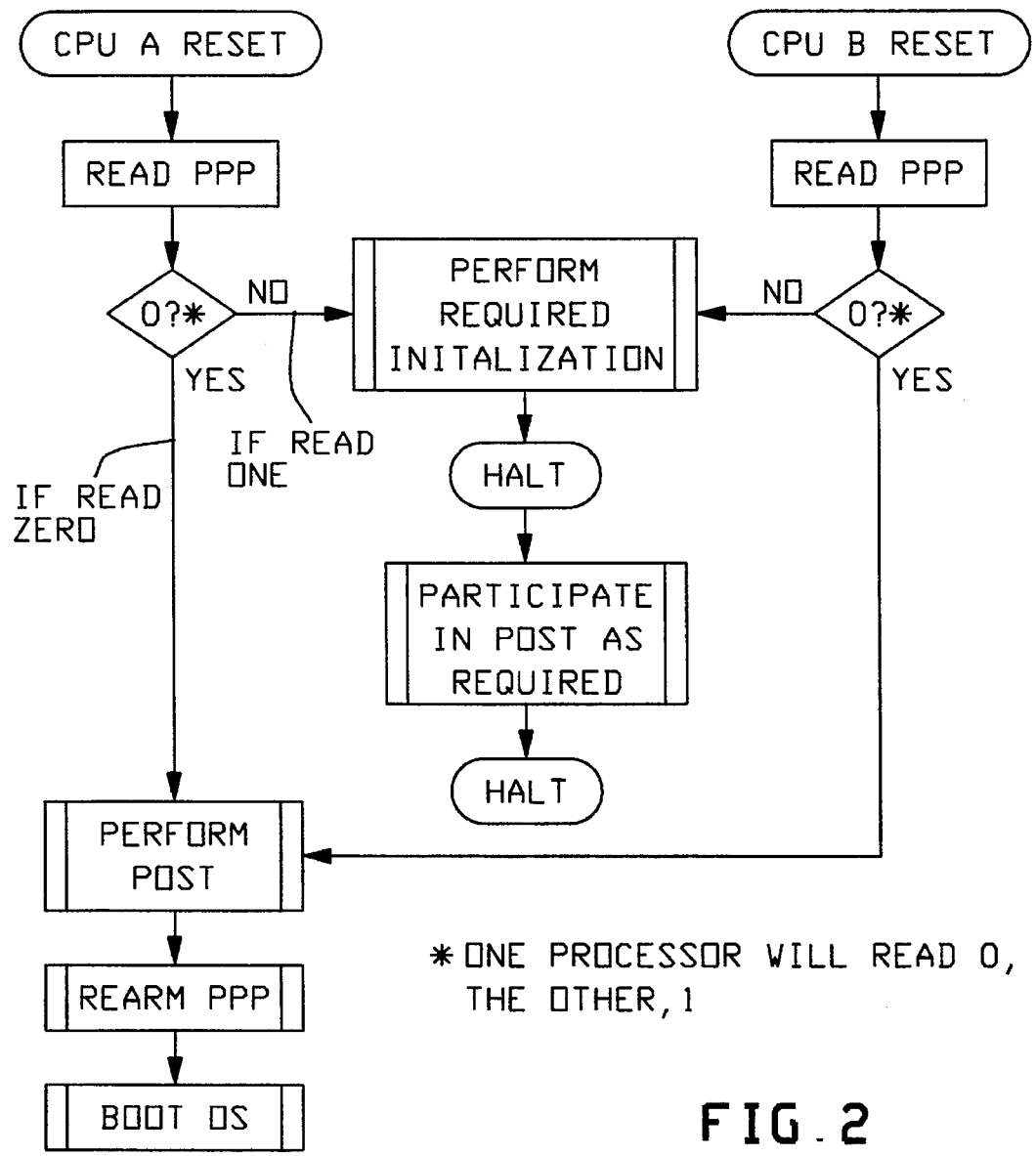
FIG. 2 is a related flow chart indicating how such an embodiment will preferably operate.

FIG. 2 is a flow chart depicting a typical POST sequence. Here, we assume that both CPUs are reset and that they proceed (soon after "reset", and after executing instructions) to read the PPP (e.g., see FIG. 1 also). Whichever CPU first reads ZERO then, will proceed to execute POST, then rearm PPP and boot the operating system (OS).

The other, non-boot, CPU will read "ONE" at PPP, and be caused to "halt" (i.e., allow the boot CPU to execute POST, while, perhaps, participating as required). Later, the operating system brings the "halted" CPU back into normal operation. Thus, one may view our PPP unit as, essentially, "gating" this "POST" (or other) sequence; and nominally able to do so for two, or more, microprocessors, while the "so-enabled" microprocessor will—at some point— also act to "rearm" PPP so a new "boot-selecting" sequence may be gated (zero reset). For three or more microprocessors some appropriate modification of OPR will be expected.

In conclusion, it will be understood that the preferred embodiments described herein are only exemplary, and that the invention is capable of many modifications and variations in construction, arrangement and use without departing from the spirit of the claims.

For example, the means and methods disclosed herein are also applicable to other related systems. Also, the present invention is applicable for enhancing other forms of multi-processor arrangements.

The above examples of possible variations of the present invention are merely illustrative. Accordingly, the present invention is to be considered as including all possible modifications and variations coming within the scope of the invention as defined by the appended claims.

What is claimed is:

1. In an AT-compatible multiprocessor array where any one processor can be needed to execute a prescribed test sequence and more than one of the processors may compete to initialize this sequence, a method of controlling this competition comprising the steps of: coupling a special I/O "semaphore port" SP to all processors; adapting this port to normally signal "GO", but after a "first-access" by a said processor, which thus becomes a "selected processor", to thereupon signal "STOP" to all other "non-selected" processors, and so deny access until the prescribed subject test sequence is completed; and also coupling "other-reset" OR means to all said processors while arranging such means OR to allow a so-selected processor to reset the other processors; said OR means being arranged to comprise an "other-processor-reset" port OPR, which, in turn, is arranged to require three back-to-back I/O cycles to confirm "other-processor-reset" and so avoid accidental reset of any non-selected processor.

2. The method of claim 1, wherein said cycles comprise: READ-WRITE-READ uninterrupted by any other I/O cycle.

3. The method of claim 2, wherein said READ-WRITE-READ sequence is repeated until "reset-other" is confirmed.

4. An AT-compatible multiprocessor array where any single multiprocessor can be needed to execute a prescribed sequence and more than one of the processors may compete to initialize this sequence, wherein a special I/O "semaphore port" SP is coupled to all processors, this port SP being adapted to normally signal "GO", but after a "first-access" by a said processor, which thus becomes a"selected processor", to thereupon signal "STOP" to all other, "non-selected", processors, and so deny access until a given test sequence is completed; and wherein a "other-reset" OR means is also coupled to all said processors and is adapted to allow a so-selected processor to reset the other processors; said "other-reset" OR means comprising an "other-processor-reset" port OPR, which requires three back-to-back I/O cycles to confirm "other-processor-reset" to so avoid accidental reset of any non-selected processor.

5. The array of claim 4, wherein said cycles comprise: READ-WRITE-READ uninterrupted by any other I/O cycle.

6. The array of claim 5, wherein said READ-WRITE-READ sequence is repeated until "reset-other" is confirmed.

* * * * *